United States Patent [19]
Pfeifer et al.

[11] Patent Number: 5,929,597
[45] Date of Patent: Jul. 27, 1999

[54] PORTABLE ELECTRICAL POWER SYSTEM TO SUPPLY DIRECT CURRENT VOLTAGE

[75] Inventors: John Edward Pfeifer, Redding, Conn.; James C. Boda, Merrimac, Wis.

[73] Assignee: Fiskars Inc., Madison, Wis.

[21] Appl. No.: 08/842,062

[22] Filed: Apr. 23, 1997

[51] Int. Cl.⁶ .................................................. H01M 10/46
[52] U.S. Cl. ........................................ 320/107; 320/114
[58] Field of Search ................................... 320/107, 111, 320/112, 114, 128, FOR 101, FOR 104, FOR 111, FOR 118, DIG. 32; 307/19, 46, 64, 150, 151; 363/62

[56] References Cited

U.S. PATENT DOCUMENTS

| | | |
|---|---|---|
| 1,530,342 | 3/1925 | Barber . |
| 3,274,476 | 9/1966 | Wildum . |
| 3,308,419 | 3/1967 | Rohowetz et al. . |
| 3,828,201 | 8/1974 | Allen, Sr. . |
| 3,919,615 | 11/1975 | Niecke . |
| 4,300,087 | 11/1981 | Meisner . |
| 4,389,704 | 6/1983 | Sasaki ........................................ 363/62 |
| 4,578,772 | 3/1986 | Fujii ........................................... 363/62 |
| 4,675,538 | 6/1987 | Epstein ....................................... 307/64 |
| 4,748,344 | 5/1988 | Sing . |
| 5,019,767 | 5/1991 | Shirai et al. . |
| 5,211,321 | 5/1993 | Rodriguez . |
| 5,656,876 | 8/1997 | Radley et al. ........................... 307/150 |

OTHER PUBLICATIONS

*High Efficiency, Synchronous, Step–down (Buck) Controllers*—Integrated Circuits (Unitrode); Feb. 1996.

*Primary Examiner*—Edward H. Tso
*Attorney, Agent, or Firm*—Foley & Lardner

[57] ABSTRACT

A Portable Power System configured to supply an appropriate voltage to an electrical device. The system includes a battery pack having at least one cell supplying a first direct current voltage, and an adapter. The adapter, which is electrically connected to the battery pack by an electrical cord, is configured to be mechanically connected to the device. The adapter also includes a DC to DC voltage converter supplying a second direct current voltage to the device, the second voltage being smaller than the first voltage but sufficient to permit the intended operation of the device.

4 Claims, 4 Drawing Sheets

PORTABLE ELECTRICAL POWER SYSTEM TO SUPPLY DIRECT CURRENT VOLTAGE

FIELD OF THE INVENTION

The present invention relates generally to a portable electrical power system. More particularly, the present invention relates to a portable power supply designed to power a tool or other electrical appliance, the system including a battery pack associated with a DC to DC voltage converter.

BACKGROUND OF THE INVENTION

Portable (also commonly known as "cordless") electrical tools and other devices, appliances, and equipment (such as video cameras and the like) require an adequate supply of power from battery packs that are typically received in a portion of the tool housing. However, because battery packs are inherently heavy, as explained in application Ser. No. 08/740,695 filed on Nov. 1, 1996 by the assignee of the present application and incorporated herein by reference, a complaint frequently expressed by users of cordless devices is that they are too heavy. To reduce forearm fatigue and other user soreness typically associated with cordless devices (and particularly with heavy cordless power tools), it is well known to locate the batteries required to power the tool in a garment or belt worn by the user.

In this regard, U.S. Pat. No. 5,211,321 issued on May 18, 1993, to N. Rodriguez, entitled "Battery And Equipment Vest," discloses a garment configured as a vest to receive several battery cells to provide power to video recording equipment. The vest includes several storage pockets placed around the waist of the user to receive the cells. Alternatively, the vest may be associated with a belt having pockets configured to house the cells. The garment may also include a device to recharge the cells when required, thereby providing a mobile and convenient power source. The battery and equipment vest has adjustable shoulder straps and adjustable waist to ensure a comfortable fit for multiple users while orderly maintaining electrical interconnections.

In other cases, as in U.S. Pat. No. 4,748,344 issued in May 31, 1988 to Sing, the weight of the battery is distributed along a belt disposed around the waist of the user. Sing also discloses that the power supply belt can include a selector switch so that the power source can be used with a variety of electrical implements having different operating voltages. In the case of U.S. Pat. No. 3,919,615, issued on Nov. 11, 1975, to R. Niecke, the belt also includes an inverter to allow its use with AC powered tools.

In all of these cases, however, the resistance of the cord connecting the power source, i.e., the garment or the belt, to the tool causes line losses which manifest themselves by a voltage drop at the tool particularly when the tool operates under significant load conditions. As a result, the tool becomes powered at a voltage that is less than its rated voltage, thereby reducing the amount of work that can be produced by the tool when it is most needed. Connections between the power source and the cord and between the cord and the tool also frequently create additional losses thereby compounding the problem. Specifically, line and connection losses generally reduce the effectiveness of the tool, both in terms of the work that can be produced by the tool and the amount of time the tool can be used without having to recharge the battery pack. This is because a portion of the energy stored in the battery pack is wasted in line and connection losses instead of being usable by the tool to be converted into work.

To compensate for these detrimental voltage losses and attempt to preserve the designed effectiveness of the tool, prior art power sources often deliver a voltage that is higher than the rated voltage of the tool with which the power source is associated. The drawback of this approach, however, is that under limited load conditions (e.g., when a relatively small amount of work is required of the tool), the current drawn by the tool is correspondingly small thereby causing the tool to operate at a voltage that is greater than its rated voltage. As is well known in the art, such over-voltage conditions may damage certain features of the tool such as for example the tool variable speed trigger circuit.

Accordingly, although these prior art portable power supplies have advantageously shifted the weight of the battery packs from the tool to the body of the user thereby rendering the use of cordless tools more comfortable to the user, these power supplies still suffer from the shortcomings generally identified above. Thus, it has become apparent to the inventors of the present invention that it is desirable to find alternate ways to compensate for line losses between the power source and the tool. In other words, it seems desirable to develop ways to more effectively power cordless tools over a broad range of operating conditions without unduly increasing the cost of portable power sources associated with these tools.

SUMMARY OF THE INVENTION

The portable power system designed to supply low level direct current voltage to a portable electrical device in accordance with the present invention includes a battery pack having at least one cell providing a first direct current voltage, and an adapter. The adapter, which is electrically connected to the battery pack by an electrical cord, is mechanically coupled to the device. The adapter includes a DC to DC voltage converter supplying a second direct current voltage to the device, the second voltage being smaller than the first voltage but sufficient to permit the intended operation of the device.

According to another aspect of the invention, the adapter includes a voltage selector to selectively match the second voltage to the device rated voltage.

According to a further aspect of the present invention, the adapter comprises a first portion configured to be mechanically and electrically connected to the device, and a second portion connected to the cord.

According to another aspect of the present invention, the voltage selector matches the second voltage to the rated voltage when the first portion is coupled to the second portion.

BRIEF DESCRIPTION OF THE DRAWINGS

The preferred exemplary embodiment of the present invention will hereinafter be described in conjunction with the appended drawings, wherein like numerals denote like elements and.

DETAILED DESCRIPTION OF A PREFERRED EXEMPLARY EMBODIMENT

The present invention relates to electrical power systems used to power cordless devices. It will become apparent from the following description that the features of the present invention may be utilized with any kind of cordless device such as power tools, video equipment, household electrical appliances and the like. However, for ease of understanding and convenience the following description will essentially simply refer to a direct current power tool. Nevertheless, those skilled in the art will readily recognize the many other applications of the present invention.

Figure 3:
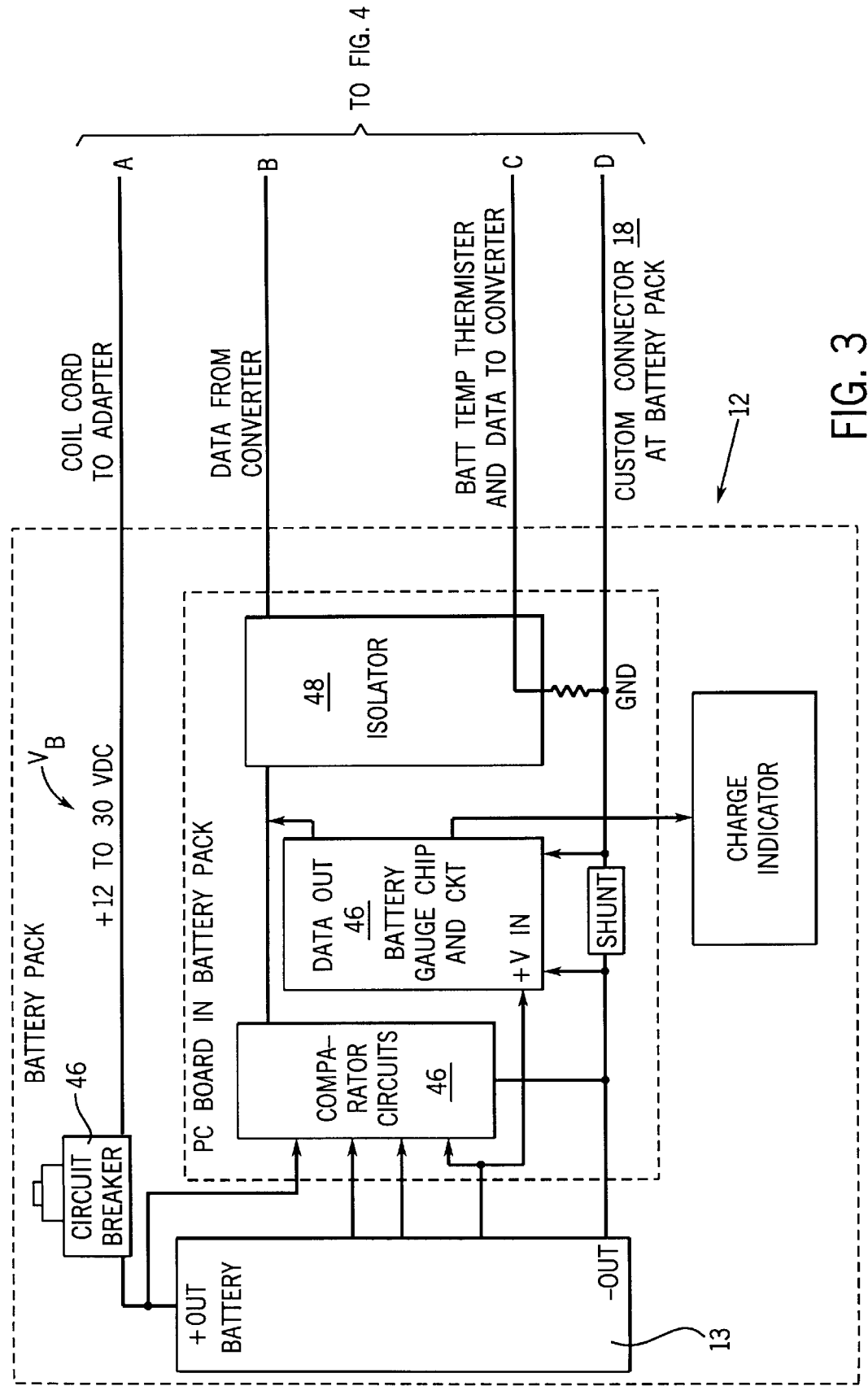
FIG. 3 is an electrical block diagram of the battery pack of the Portable Power System of the present invention.

Referring to the Figures, a portable electrical power system in accordance with the present invention generally designated as 10 is used to power an electrical device 20. Power system 10 includes a battery pack 12 having at least one cell 13 (diagrammatically shown on FIG. 3). Battery pack 12 which is preferably, although not necessarily, of the rechargeable type, is connected via an electrical cord 14 to an adapter 16. For ease of operation of power system 10 by the user, cord 14 is provided with a suitable connector 18 to allow adapter 16 to be disconnected from battery pack 12. In the event cells 13 are of the rechargeable type, the user will typically disconnect connector 18 from battery pack 12 and connect a charger (not shown) to recharge cells 13.

Power system 10 may be advantageously associated with a back pack-type garment 22 to be worn by the user. As shown on FIG. 1, garment 22 includes a plurality of straps 24 and a belt 26, to be secured over and around the shoulders and waist of a user (not shown), respectively. Straps 24 and belt 26 may be adjustable to further facilitate the use of power system 10. Alternatively, power system 10 may simply be associated with a belt disposed around the waist of the user, or it may be configured to be clipped onto the user's belt.

Figure 1:
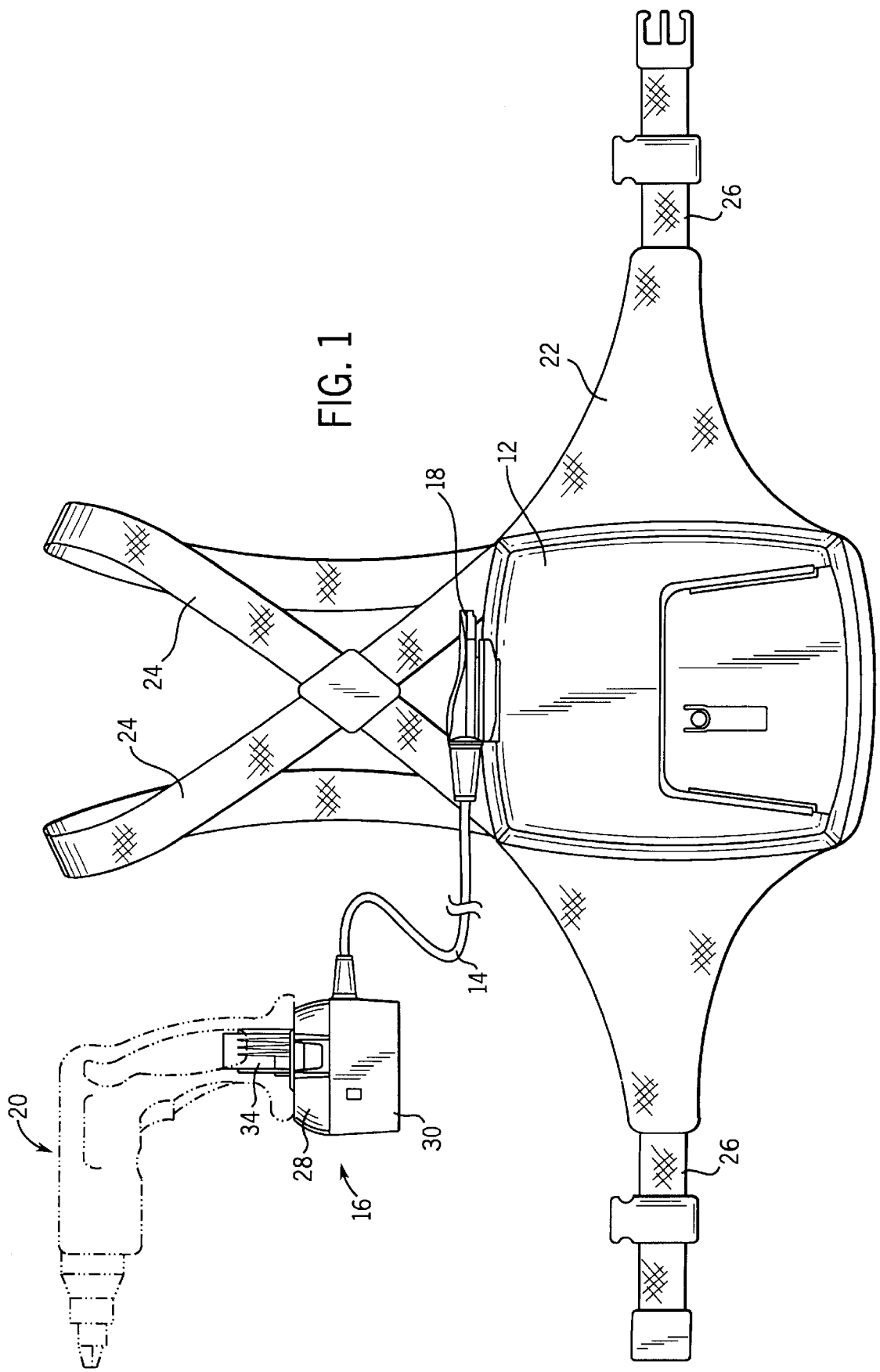
FIG. 1 is an elevational view of the Portable Power System of the present invention, the system being associated with a back-pack to be worn by the user.
Figure 2:
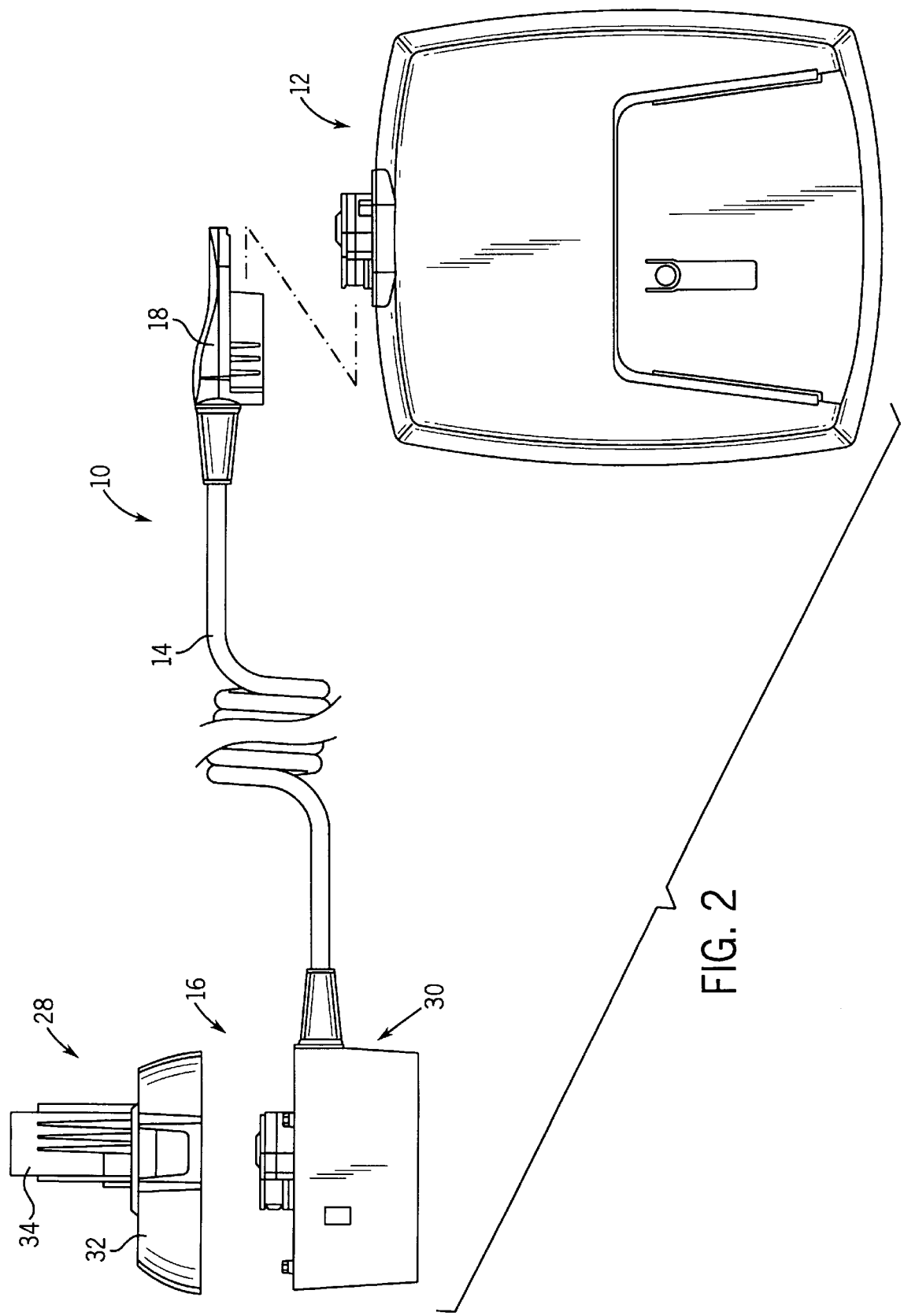
FIG. 2 is an elevational view of the battery pack and associated cord and adapter of the Portable Power System of the present invention.

Referring more particularly to FIG. 2, adapter 16, which is preferably permanently connected at the end of cord 14 opposite that fitted with connector 18, is configured to permit its mechanical coupling and electrical connection to a device 20, which is illustrated as a power drill on FIG. 1. In the preferred embodiment of the present invention, adapter 16 is formed of a first portion 28 configured to be mechanically and electrically connected to device 20, and of a second portion 30 connected to cord 14. For purposes of illustration only, portion 28 is represented as having a base 32 connected to a stem 34 extending away from base 32. As shown on FIG. 1, stem 34 is inserted into a portion of device 20 when adapter 16 is connected thereto. The illustrated device 20 is of the well-known sort, such as a cordless drill, powered by a battery pack which conventionally is inserted into a handle cavity designed to receive the battery pack. This handle cavity is now used by the stem 34 to make a mechanical and electrical connection to the device 20. Advantageously, second portion 30 is configured to be releasably attached to first portion 28 so that various devices 20 can be powered by a single power system 10 simply by associating second portion 30 with an appropriately configured first portion 28.

Alternatively, however, adapter 16 can be formed in one piece. In that case, to power several devices 20 representing various operating voltages and configurations, a user would have several adapters 16, each adapter 16 being dedicated to a particular device to be powered by portable system 10. An alternate adapter 16 for an alternate device 20 is shown in phantom in FIG. 1. Also, instead of being permanently mechanically attached to adapter 16 as shown in FIG. 2, cord 14 could be releasably connected to adapter 16 using an appropriate connector (not shown). This configuration, however, would most likely create potentially detrimental voltage losses at that additional connection.

In accordance with the invention, adapter 16 includes a DC to DC voltage converter 36. Converter 36 supplies to device 20 a second direct current voltage designated as $V_T$ on FIG. 4. $V_T$ will generally correspond to the voltage that has been rated by the manufacturer of device 20. The function of voltage converter 36 is to step down first voltage $V_B$ produced by battery pack 12 at connector 18 (as shown on FIG. 3) to second voltage $V_T$.

As is well known in the art, the higher the voltage the lower the line losses over a given transmission line when power is drawn by a device connected to the transmission line. Accordingly, because first voltage $V_B$ which, in accordance with the present invention is higher than second voltage $V_T$ needed at device 20, is transmitted by electrical cord 14, line losses occurring during the operation of device 20 are reduced. Using converter 36 at adapter 16 also permits a reduction of the voltage losses caused by the internal resistance of cells 13 contained in battery pack 12.

Second voltage $V_T$, which is needed at device 20, generally although not necessarily corresponds to the rated voltage of device 20, that is the voltage that should normally be applied to device 20 for such device to operate as designed by the manufacturer of such item. As noted earlier, it is desirable to be able to use power system 10 with a variety of devices 20. In certain cases, however, such devices may have significantly different rated voltages.

Figure 4:
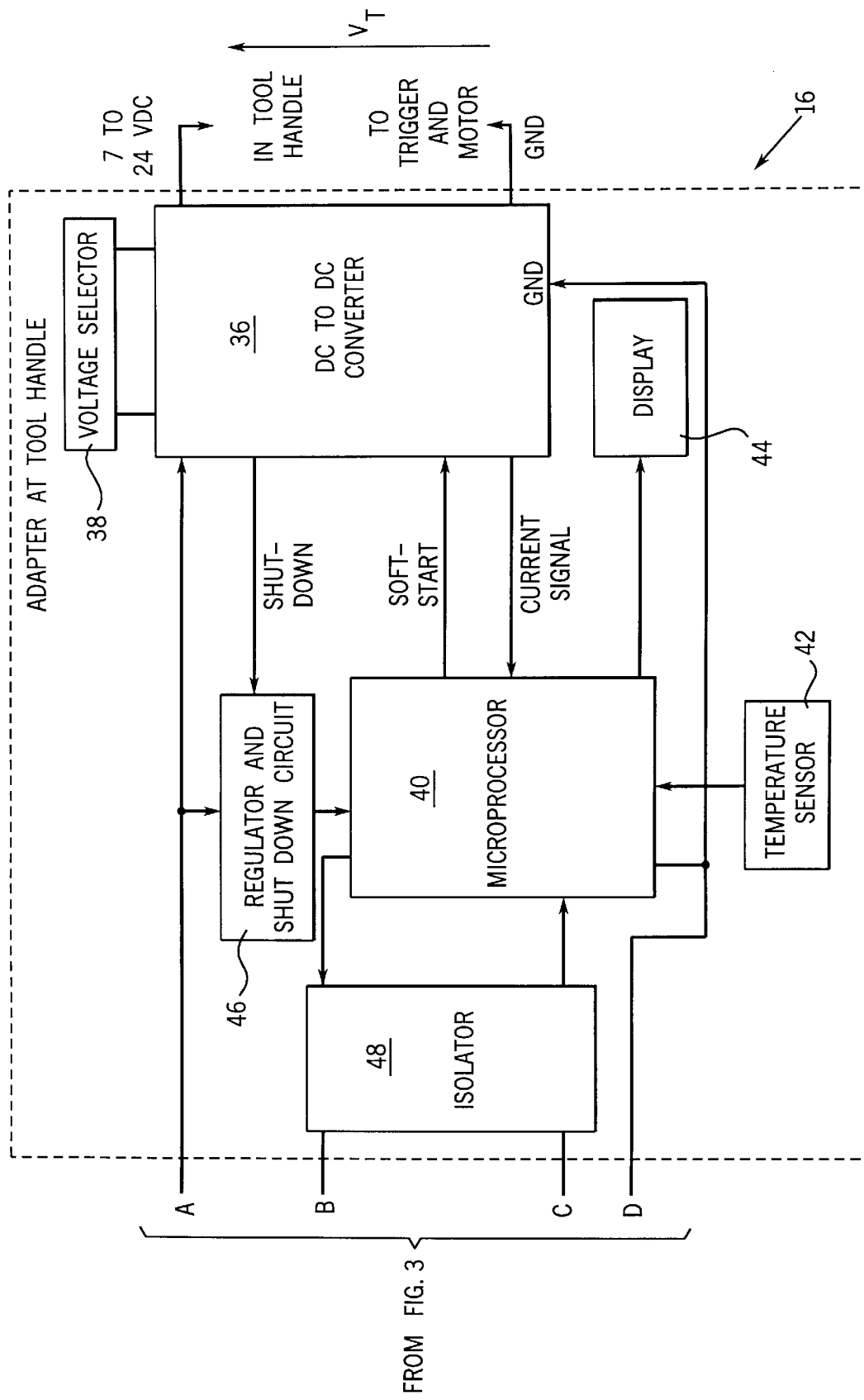
FIG. 4 is an electrical block diagram of the adapter of the Portable Power System of the present invention.

Accordingly, power system 10 may also include a voltage selector designated generally as 38 on FIG. 4. Voltage selector 38 cooperates with voltage converter 36 to permit adapter 16 to supply the appropriate voltage (typically the voltage for which device 20 is rated) to device 20. Voltage selector 38 may include a plurality of mechanical or solid state switches, that are selectively activated when adapter 16 is coupled to device 20. Since three switches provides eight possible permutations, such combination of three switches would allow adapter 16 to power commercially available devices that have rated voltages of 7.2, 9.6, 12, 14, 18, and 24 volts, for example. In the event adapter 16 is formed of first and second portions (28, 30), second portion 30 may include a plurality of mechanical micro-switches (commonly known in the trade as "Reed switches") that are activated by cammed regions formed on base 32 when base 32 is mechanically coupled to second portion 30. Alternatively, selector 38 may simply consist of a dedicated resistor housed in base 32 of first portion 28. Upon mating of first portion 28 with second portion 30 the voltage selector resistor will become electrically connected to converter 36 housed in second portion 30.

Voltage converter 36 may take many forms, so long as it is capable of effectively stepping first voltage $V_B$ down to second voltage $V_T$. In the commercial embodiment presently being contemplated by the assignee of the present invention, voltage converter 36 is a step-down (also called "buck") DC/DC converter. Converter 36 includes as its essential component integrated circuit no. UC3874, the description and operation of which is included in a preliminary Unitrode technical bulletin dated February 1996 covering integrated circuits UC1874, 2874, and 3874, which is incorporated herein by reference. Converter 36 also includes MOSFET switches to minimize conduction losses, since it is well known that MOSFET switches have a relatively low conduction resistance. Converter 36 is controlled, synchronized, and optimized by a microprocessor 40. To perform these functions, the inventors have presently selected for microprocessor 40 integrated circuit no. PIC16C71 by Microchip.

Finally, power system 10 may also include additional features that may increase its versatility. For example, adapter 16 may be provided with a light source 28b, the light source being designed to illuminate a region extending about device 20, for example when adapter 16 is coupled to device 20. Adapter 16 may also include various sensing and indicating components such as a temperature sensor 42 which monitors the operating temperature of adapter 16, a display 44 which is could be a seven segment LED display or individual LED's grouped in a bar graph configuration to provide a read out of battery charge, operating temperature, and other operating conditions of power system 10. Power system 10 may also include various monitoring and control modules 46, circuit isolators 48, and associated components.

It is understood that the above description is of a preferred exemplary embodiment of the present invention, and that the invention is not limited to the specific forms described. For example, while the invention has been described in association with a device taking the form of a power tool, it can be used with other items such video equipment, household appliances, and the like. Adapter 16 may also take many other forms so long as it is proximately associated with voltage converter 36. Moreover, for a variety of reasons it may be desirable for battery pack 12 to include a single cell 13 or a plurality of cells, which may be rechargeable or disposable. It should be understood, however, that these and other substitutions, modifications, changes and omissions may be made in the design and arrangement of the elements disclosed herein without departing from the scope of the appended claims.

We claim:

1. A portable power system, comprising:

a battery pack having at least one cell, the battery pack supplying a first direct current voltage;

an adapter electrically connected to the battery pack by an electrical cord, the adapter being formed of two mating portions;

a DC to DC voltage converter received within the adapter, the converter supplying a second direct current voltage, the second voltage being smaller than the first voltage; and a voltage selector to selectively match the second voltage to a rated voltage of a device powered by the power system, the voltage selector selectively matching the second voltage to the rated voltage upon coupling the two mating portions.

2. A portable power system, comprising:

a battery pack having at least one cell, the battery pack supplying a first direct current voltage;

an adapter electrically connected to the battery pack by an electrical cord; and a zero current crossing synchronized converter received within the adapter, the converter supplying a second direct current voltage, the second voltage being smaller than the first voltage.

3. An electrical power supply system for any of a plurality of electrical devices which are carried by a user while in use and which have different rated input voltage requirements, comprising:

a plurality of adapters each adapted to be fitted to at least a respective one of the plurality of electrical devices, each adapter having a rated voltage indicator which represents the rated voltage of the respective one of the electrical devices;

a power converter adapted to be removably mounted on any of the plurality of adapters and having a rated voltage sensor, the rated voltage sensor coupled to the rated voltage indicator of an adapter to sense the rated voltage when the power converter is mounted on the adapter;

a remote power source supplying power at a first voltage significantly higher than at least some of the rated voltages of the plurality of electrical devices; and a cord electrically connecting the remote power source to the power converter, the power converter converting the first voltage to an indicated one of the rated voltages responsive to the rated voltage sensor sensing the rated voltage.

4. The electrical power system of claim 3, wherein the remote power source is a DC battery pack.

* * * * *